(12) United States Patent
Chu

(10) Patent No.: US 8,601,180 B1
(45) Date of Patent: Dec. 3, 2013

(54) COMPOSITE FUNCTIONAL TRANSMISSION LINE

(75) Inventor: Yung-Chiang Chu, Taipei (TW)

(73) Assignee: Fluiditech IP Limited, Victoria, Mahe (SC)

( * ) Notice: Subject to any disclaimer, the term of this patent is extended or adjusted under 35 U.S.C. 154(b) by 0 days.

(21) Appl. No.: 13/541,152

(22) Filed: Jul. 3, 2012

(51) Int. Cl.
*G06F 3/01* (2006.01)

(52) U.S. Cl.
USPC ............................... 710/38; 710/62

(58) Field of Classification Search
None
See application file for complete search history.

(56) References Cited

U.S. PATENT DOCUMENTS

| | | | |
|---|---|---|---|
| 6,934,788 B2 * | 8/2005 | Laity et al. | 710/303 |
| 7,185,126 B2 * | 2/2007 | Szabelski | 710/60 |
| 7,478,191 B2 * | 1/2009 | Wurzburg et al. | 710/316 |
| 7,653,772 B2 * | 1/2010 | Hayashi et al. | 710/306 |
| 7,899,970 B2 * | 3/2011 | Mori | 710/313 |
| 8,135,883 B2 * | 3/2012 | Monks et al. | 710/38 |
| 8,259,444 B2 * | 9/2012 | Jobs et al. | 361/679.56 |
| 8,386,580 B1 * | 2/2013 | Thomas | 709/213 |
| 2003/0008563 A1 * | 1/2003 | Nishio et al. | 439/625 |
| 2003/0135681 A1 * | 7/2003 | Laity et al. | 710/303 |
| 2006/0059293 A1 * | 3/2006 | Wurzburg et al. | 710/313 |
| 2006/0227759 A1 * | 10/2006 | Bohm et al. | 370/351 |
| 2006/0277334 A1 * | 12/2006 | Sim et al. | 710/62 |
| 2012/0054378 A1 * | 3/2012 | Malamant et al. | 710/19 |

* cited by examiner

*Primary Examiner* — Cheng-Yuan Tseng
(74) *Attorney, Agent, or Firm* — Morris Manning & Martin LLP; TIm Tingkang Xia, Esq.

(57) ABSTRACT

A composite functional transmission line is used as a medium for transmitting data between a plurality of electronic devices, and the composite functional transmission line is capable of performing bi-directional data transmissions with the electronic devices directly, and the composite functional transmission line includes a substrate, a plurality of transmission units and an extension unit. Each of the transmission units has two electrical connection terminals, and one of the two electrical connection terminals is provided for connecting the electronic devices, and the other one of the two electrical connection terminals is connected to the substrate, and the extension unit is installed onto the substrate and coupled to the transmission units through the substrate, so that bi-directional data transmissions can be performed between the extension unit and the transmission units.

9 Claims, 6 Drawing Sheets

COMPOSITE FUNCTIONAL TRANSMISSION LINE

FIELD OF THE INVENTION

The present invention relates to a composite functional transmission line, in particular to the composite functional transmission line used as a medium for transmitting data between a plurality of electronic devices and the composite functional transmission line is coupled directly to the electronic devices for transmitting the data bi-directionally.

BACKGROUND OF THE INVENTION

In general, most users possess a plurality of electronic devices such as Smartphone and tablet PC, and the users may need to share a common file in the electronic devices, and the file contains data including photo, text, music or movie.

In addition, the users can install wireless and cable communication modules in the electronic devices for transmitting the file. Wherein, the cable communication transmission module is used as an example for illustration, and the cable communication module generally comes with a female connector, so that a user must have a transmission line with an additional male connector before the user can transmit the file between two electronic devices.

However, the conventional transmission line is simply provided for transmitting data (or electric power) between the electronic devices only. The user may want to have a multi-functional transmission line (such that the transmission line has the functions of a flash memory for storing data or a card reader for reading a memory card), and the multifunctional transmission line not only enhances the applicability and efficiency of the transmission line, but also overcomes the problem of carrying the flash memory or the card reader inconveniently.

SUMMARY OF THE INVENTION

It is a primary objective of the present invention to provide a composite functional transmission line used as a medium for transmitting data between a plurality of electronic devices, and the composite functional transmission line can perform bi-directional data transmissions with the electronic devices directly.

Another objective of the present invention is to provide the aforementioned composite functional transmission line that provides a built-in extension unit for transmitting data stored in the extension unit to the electronic devices.

A further objective of the present invention is to provide the aforementioned composite functional transmission line having an extension unit with the memory card reading function such as a card reader for reading the data from the memory card and transmitting the data to the electronic devices.

Another objective of the present invention is to provide the aforementioned composite functional transmission line capable of retrieving data from the electronic devices and backing up the data to the extension unit which is a built-in memory such as a NAND flash and a solid-state drive (SSD), and obtaining data from any one of the electronic devices directly to achieve the on-the-go effect.

Another objective of the present invention is to provide the aforementioned composite functional transmission line that uses a combining unit to form the composite functional transmission line in a ring-shaped structure to facilitate users to carry the transmission line.

To achieve the aforementioned and other objectives, the present invention provides a composite functional transmission line used as a medium for transmitting data between a plurality of electronic devices and coupled directly to the electronic devices for transmitting the data bi-directionally, and the composite functional transmission line comprises a substrate, a plurality of transmission units and an extension unit. Wherein, each of the transmission units has two electrical connection terminals and is electrically coupled to the substrate through one of the two electrical connection terminals, and the transmission unit is coupled to one of the electronic devices through the other one of the two electrical connection terminals, and the transmission units are provided for extending one of a plurality of transmission ports to the exterior of the substrate. The extension unit is installed onto the substrate and coupled to the transmission unit through the substrate and provided for performing bi-directional data transmissions with at least one of the transmission units.

Compared with the prior art, the composite functional transmission line of the present invention can be used for transmitting data between a plurality of electronic devices bi-directionally or connected to any one of the electronic devices to transmit data bi-directionally.

Based on the extension unit (such as an external port, a built-in memory or a memory card accessor) selected for the composite functional transmission line, the function of storing or retrieving data can be achieved through the transmission line.

In the present invention, the data can be transmitted between the transmission ports in a sequentially continuous fashion.

In the present invention, the switching unit is provided for switching a connecting path between the transmission ports, and a route switching table is provided, so that the composite functional transmission line can switch the connecting path between the transmission ports automatically according to the route switching table, and the route switching table can be used to determine the data to be transmitted between the transmission ports.

DETAILED DESCRIPTION OF THE PREFERRED EMBODIMENTS

The objects, characteristics and effects of the present invention will become apparent with the detailed description of the preferred embodiments and the illustration of related drawings as follows.

Figure 1:
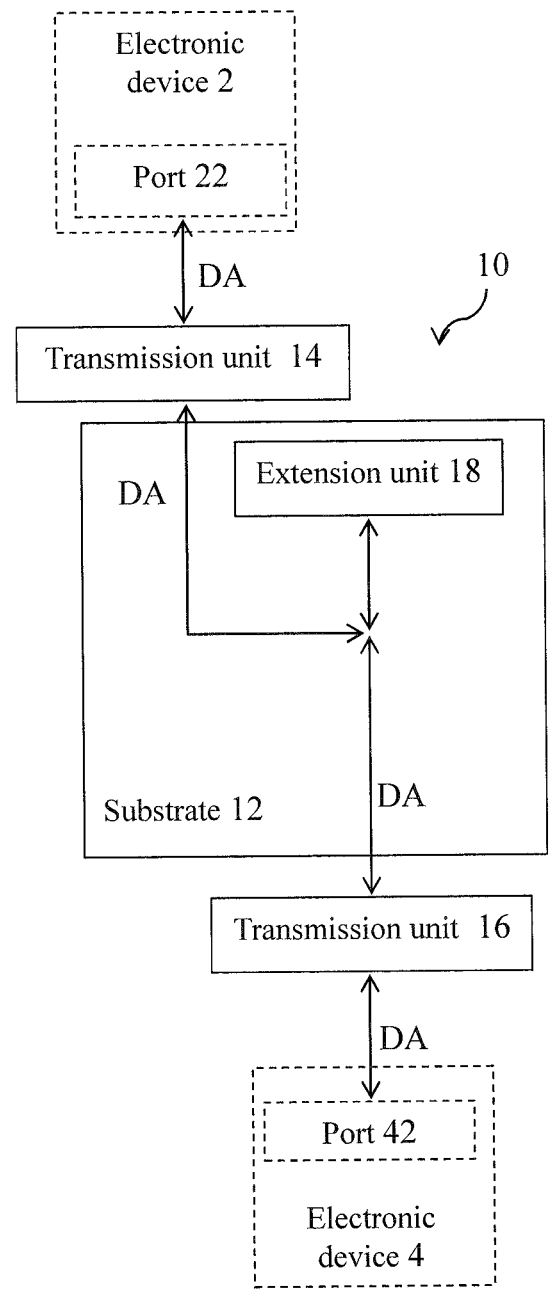
FIG. 1 is a schematic block diagram of a composite functional transmission line in accordance with a first preferred embodiment of the present invention.

With reference to FIG. 1 for a schematic block diagram of a composite functional transmission line in accordance with the first preferred embodiment of the present invention, the composite functional transmission line 10 is used as a medium for transmitting data between a plurality of electronic devices 2, 4, and the composite functional transmission line 10 performs bi-directional transmissions of the data DA with the electronic devices 2, 4 directly. Wherein, the electronic devices 2, 4 can be Smartphones, tablet PCs or desktop computers. In this preferred embodiment, the electronic devices 2, 4 are Smartphones, and the electronic devices 2, 4 match the ports 22, 24 of a communication port specification including the FireWire (IEEE 1394), universal serial bus (Universal Serial Bus), micro universal serial bus (Micro USB), mini universal serial bus (Mini USB) and Apple 30-pin specifications.

Wherein, the composite functional transmission line 10 comprises a substrate 12, a plurality of transmission units 14, 16 and an extension unit 18.

The substrate 12 can be a printed circuit board provided for installing the transmission units 14, 16 and the extension unit 18 thereon. In addition, a containing space formed in a housing (not shown in the figure) is provided for containing the substrate 12, the transmission units 14, 16 and the extension unit 18.

Each of the transmission units 14, 16 has two electrical connection terminals (not shown in the figure). Wherein, the transmission units 14, 16 are coupled to the substrate 12 through one of the electrical connection terminals, and the transmission units 14, 16 are coupled to the electronic devices 2, 4 through the other one of the electrical connection terminals. Wherein, the transmission unit 14, 16 complies with a communication port specification including the FireWire (IEEE 1394), universal serial bus (USB), micro universal serial bus (Micro USB), mini universal serial bus (Mini USB) and Apple 30-pin specifications to match the configuration of the ports 22, 24 of the electronic devices 2, 4.

The extension unit 18 is installed onto the substrate 12, and the extension unit 18 is coupled to the transmission unit 14, 16 through the substrate 12. Wherein, the extension unit 18 is an external port, a built-in memory and/or a memory card accessor.

For example, if the extension unit 18 is an external port, the extension unit 18 such as a card reader or a flash memory can be connected through an external port; if the extension unit 18 is a built-in memory, the extension unit 18 is capable of storing the data DA directly. For example, the built-in memory can be a NAND flash or a solid-state drive (SSD); or if the extension unit 18 is a memory card accessor (also known as a card reader), then the composite functional transmission line 10 can access data stored in an external memory directly by the memory card accessor.

Therefore, the data DA can be transmitted bi-directionally through the extension unit 18 and/or the transmission units 14, 16.

Figure 2:
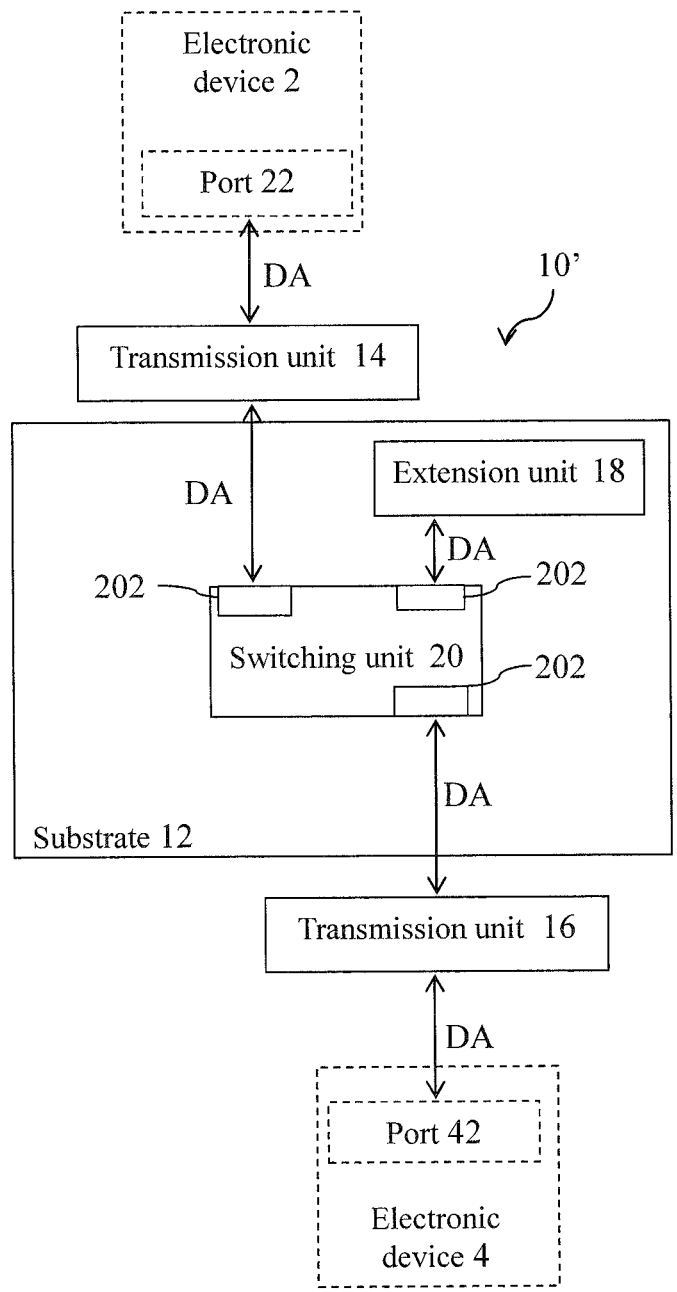
FIG. 2 is a schematic block diagram of a composite functional transmission line in accordance with a second preferred embodiment of the present invention.

With reference to FIG. 2 for a schematic block diagram of a composite functional transmission line in accordance with the second preferred embodiment of the present invention, the composite functional transmission line 10' further comprises a switching unit 20, in addition to the substrate 12, the transmission units 14, 16 and the extension unit 18 as described in the first preferred embodiment.

The switching unit 20 is installed onto the substrate 12 and coupled to the transmission units 14, 16 and the extension unit 18. Wherein, the switching unit 20 has a plurality of transmission ports 202.

Figure 3:
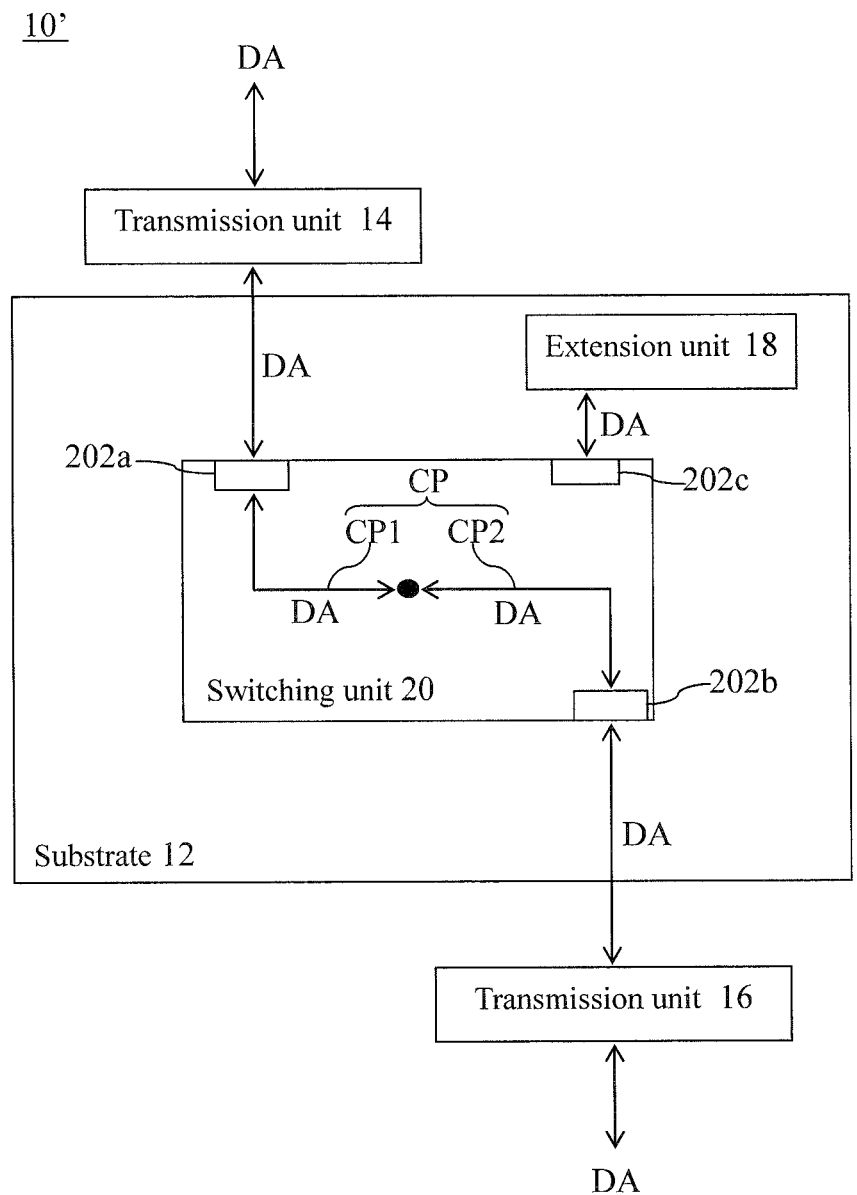
FIG. 3 is a schematic view of a switch of a switching unit as depicted in FIG. 2.

With reference to FIG. 3 for a schematic view of a switch of the switching unit 20 as depicted in FIG. 2, the switching unit 20 of this preferred embodiment has three transmission ports 202a, 202b, 202c. Wherein, the switching unit 20 forms a connecting path CP between the transmission ports 202a, 202b, 202c, so that the data DA can be transmitted bi-directionally between the transmission ports 202a, 202b, 202c according to the connecting path CP. Wherein, the connecting path CP is comprised of a first connecting path CP1 and a second connecting path CP2.

More specifically, the transmission port 202a is coupled to the transmission unit 14, and the transmission port 202b is coupled to the transmission unit 16, and the transmission port 202c is coupled to the extension unit 18. For example, if it is necessary to connect the transmission unit 14, 16, then the switching unit 20 will direct the first connecting path CP1 to the transmission port 202a and the second connecting path CP2 to the transmission port 202b, so that the transmission unit 14, 16 can transmit the data DA bi-directionally by using the connecting path CP for an electric connection.

Figure 4:
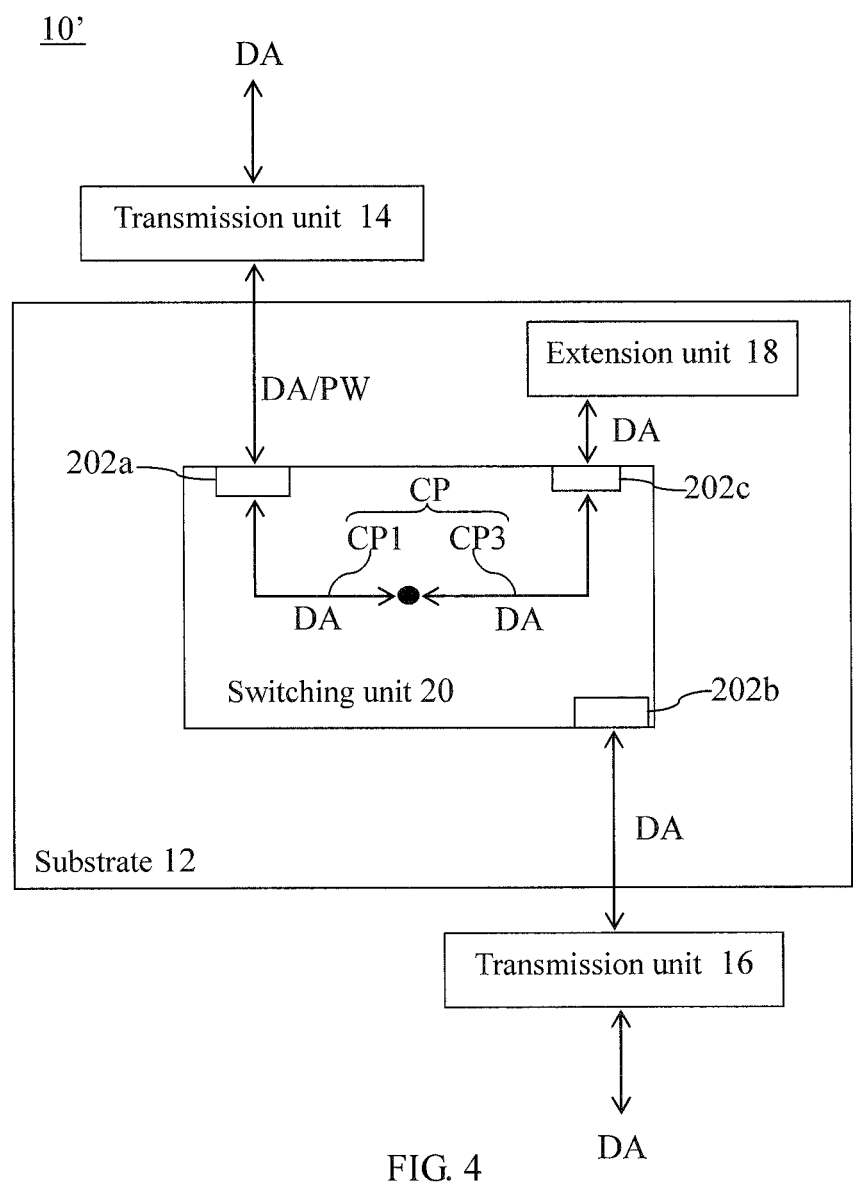
FIG. 4 is a schematic view of another switch of the switching unit as depicted in FIG. 2.

With reference to FIG. 4 for a schematic view of another switch of the switching unit as depicted in FIG. 2, if it is necessary to connect the transmission unit 14 with the extension unit 18, the switching unit 20 will direct the first connecting path CP1 to the transmission port 202a and the third connecting path CP3 to the transmission port 202c, so that the transmission unit 14 and the extension unit 18 can transmit the data DA bi-directionally by using the connecting path CP for an electric connection.

Figure 5:
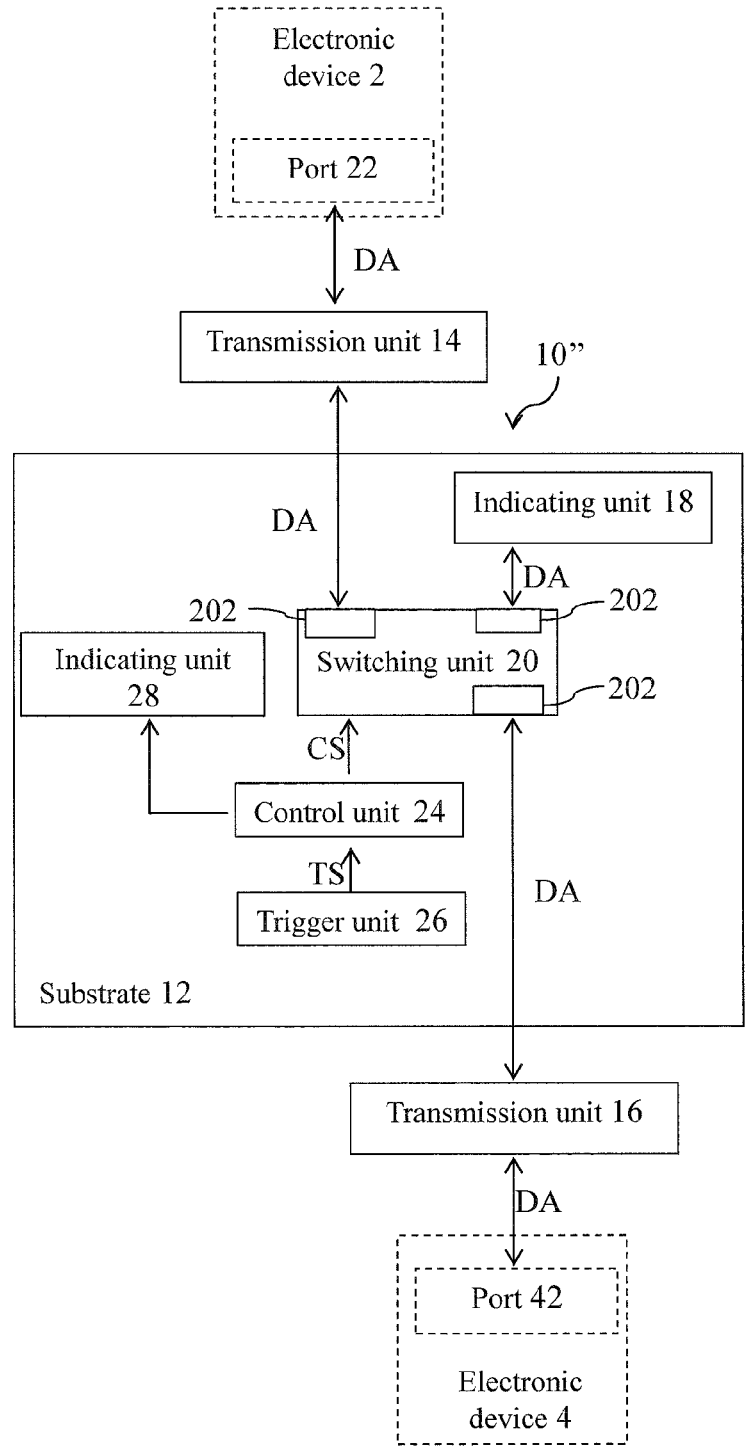
FIG. 5 is a schematic block diagram of a composite functional transmission line in accordance with a third preferred embodiment of the present invention.

With reference to FIG. 5 for a schematic block diagram of a composite functional transmission line in accordance with the third preferred embodiment of the present invention, the composite functional transmission line 10" further comprises a control unit 24, a trigger unit 26 and an indicating unit 28, in addition to the substrate 12, the transmission units 14, 16, the extension unit 18 and the switching unit 20 as described in the second preferred embodiment.

Wherein, the control unit 24 is coupled to the switching unit 20, and the control unit 24 generates a control signal CS to determine a connecting path (not shown in the figure) between the transmission ports 202 of the switching unit 20. In this preferred embodiment, the control unit 24 can store a route switching table (not shown in the figure) in advance, so that when the connecting statuses of the transmission units 14, 16 and the extension unit 18 occur simultaneously, the control unit 24 can switch the connecting path CP between the transmission ports 202 according to the route switching table automatically. Wherein, the route switching table records how the control unit 24 controls the control signal CS with a priority of the connecting path when the transmission units 14, 16 and the extension unit 18 are connected simultaneously.

The trigger unit 26 is coupled to the control unit 24. Wherein, the trigger unit 26 generates a trigger signal TS to drive the control unit 24 to execute a switch of the connecting path CP between the transmission ports 202 of the switching unit 20. For example, the trigger unit 26 is a press button, a switch knob, or a touch switch. After a user generates the trigger signal TS from the trigger unit 26, the control unit 24 executes a switch of the connecting path according to the trigger signal TS.

The indicating unit 28 is coupled to the control unit 24 and provided for indicating an action executed between the extension unit 18, the switching unit 14 and the transmission units 14, 16 according to the connecting path CP. In another preferred embodiment, the indicating unit 28 is installed onto the substrate 12 and/or the transmission units 14, 16 and provided for indicating a connecting status of the transmission units 14, 16 with the extension unit 18.

Figure 6:
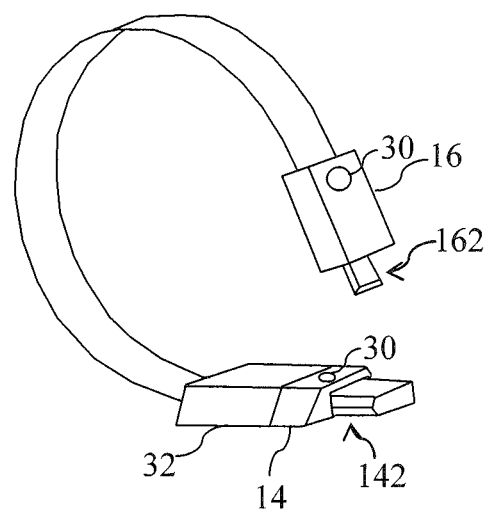
FIG. 6 is a schematic block diagram of a composite functional transmission line in accordance with a fourth preferred embodiment of the present invention.

With reference to FIG. 6 for a schematic block diagram of a composite functional transmission line in accordance with the fourth preferred embodiment of the present invention, the composite functional transmission line 10''' further comprises a plurality of combining units 30, in addition to the substrate 12, the transmission units 14, 16, the extension unit 18 and the switching unit 20 as described in the second preferred embodiment. In this preferred embodiment, the substrate 12, the extension unit 18 and the switching unit 20 are installed in a containing space in a housing 32.

The combining units 30 are installed at the transmission units 14, 16 respectively and provided for a plurality of electrical connection terminals 142, 162 coupled to the electronic device to combine with the combining units 30 respectively in order to fix the transmission units 14, 16 to form a ring-shaped body, so that a user can wear or carry the transmission line conveniently. For example, the combining units 30 can be a magnet, a buckle or a slot.

Therefore, the composite functional transmission line of the present invention can perform bi-directional data transmissions between a plurality of electronic devices, and also can connect one of the electronic devices to perform bi-directional data transmissions.

Based on the extension unit (such as an external port, a built-in memory or a memory card accessor) selected for the composite functional transmission line, the function of storing or retrieving data can be achieved through the transmission line.

In the present invention, data are transmitted between the transmission ports by a sequentially continuous fashion.

In addition, the switching unit of the present invention can be used for switching the connecting path between the transmission ports, and a route switching table is provided, so that the composite functional transmission line can switch the connecting path between the transmission ports automatically according to the route switching table, and the route switching table can be used to determine the data to be transmitted between the transmission ports.

While the invention has been described by means of specific embodiments, numerous modifications and variations could be made thereto by those skilled in the art without departing from the scope and spirit of the invention set forth in the claims.

What is claimed is:

1. A composite functional transmission line, used as a medium for transmitting data between a plurality of electronic devices, and coupled to the electronic devices directly for transmitting the data bi-directionally, and the composite functional transmission line comprising:

a substrate;

a plurality of transmission units, each having two electrical connection terminals, and electrically coupled to the substrate through one of the two electrical connection terminals, and the transmission unit being coupled to one of the electronic devices through the other one of the two electrical connection terminals, and the transmission units being provided for extending one of a plurality of transmission ports to the exterior of the substrate;

an extension unit, installed onto the substrate, and coupled to the transmission unit through the substrate, and provided for performing a bi-directional data transmission with at least one of the transmission units;

a switching unit, installed onto the substrate and coupled to the transmission units and the extension unit, and the switching unit comprises a plurality of transmission ports and a connecting path formed between the transmission ports, such that the data can be transmitted between the transmission ports bi-directionally according to the connecting path;

a control unit, coupled to the switching unit and provided for generating a control signal to determine the connecting path between the transmission ports of the switching unit, wherein the control unit generates the control signal automatically according to a connecting status of the transmission units with the extension unit to control the switching unit to switch the connecting path between the transmission ports; and a route switching table, stored in the control unit, and when the connecting statuses of the transmission units and the extension unit occur simultaneously, the control unit switches the connecting path between the transmission ports according to the route switching table.

2. The composite functional transmission line of claim 1, further comprising a trigger unit coupled to the control unit, and the trigger unit generating a trigger signal to drive the control unit to switch the connecting path between the transmission ports by the switching unit.

3. The composite functional transmission line of claim 2, wherein the trigger unit is one selected from the collection of a press button, a switch knob and a touch switch.

4. The composite functional transmission line of claim 2, further comprising an indicating unit coupled to the control unit for indicating an action executed between the extension unit, the switching unit and the transmission units according to the connecting path.

5. The composite functional transmission line of claim 4, wherein the indicating unit is installed at at least one of the substrate and the transmission units.

6. The composite functional transmission line of claim 1, wherein the extension unit is one selected from the collection of an external port, a built-in memory and a memory card accessor.

7. The composite functional transmission line of claim 1, wherein the transmission unit complies with a communication port specification selected from the collection of FireWire (IEEE 1394), universal serial bus (Universal Serial Bus), micro universal serial bus (Micro USB), mini universal serial bus (Mini USB), and Apple 30-pin specifications.

8. The composite functional transmission line of claim 1, further comprising a plurality of combining units installed at the transmission units respectively and provided for combining the electrical connection terminal coupled to the electronic device to form a ring-shaped body.

9. The composite functional transmission line of claim 8, wherein the combining unit is one selected from the collection of a magnet, a buckle and a slot.

* * * * *